Dec. 31, 1968 W. MINNICH 3,418,858
VARIABLE TRANSMISSION
Filed Sept. 1, 1966 Sheet 1 of 11

Inventor
Willy Minnich
by Michael S. Striker

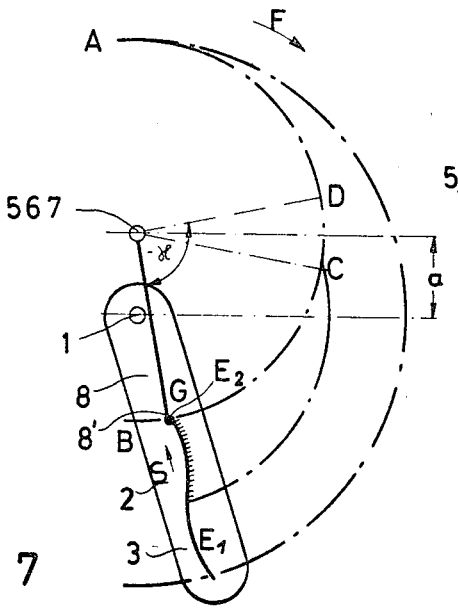
Fig. 7
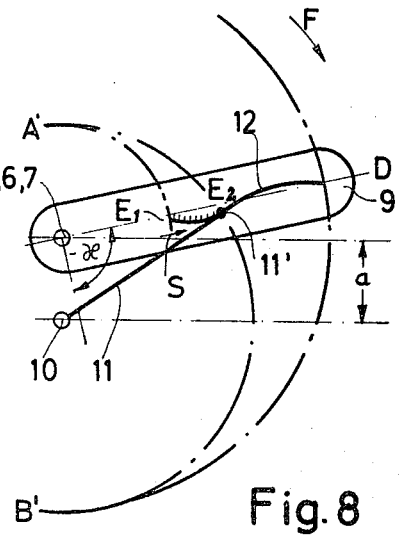
Fig. 8
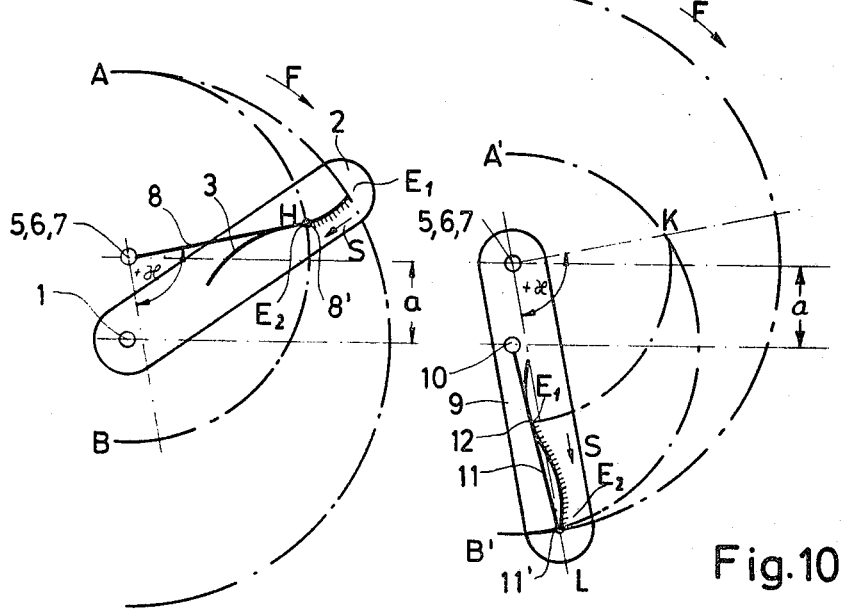
Fig. 9
Fig. 10

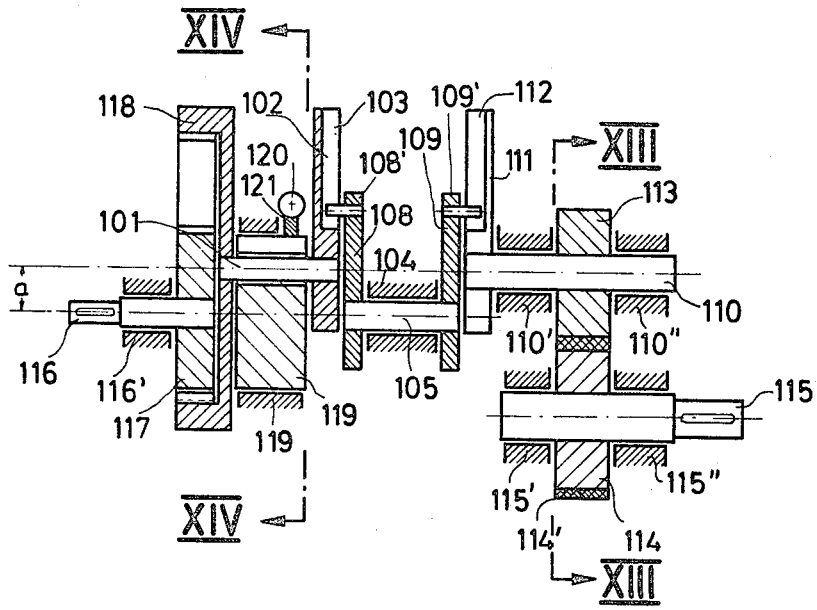
Fig. 12
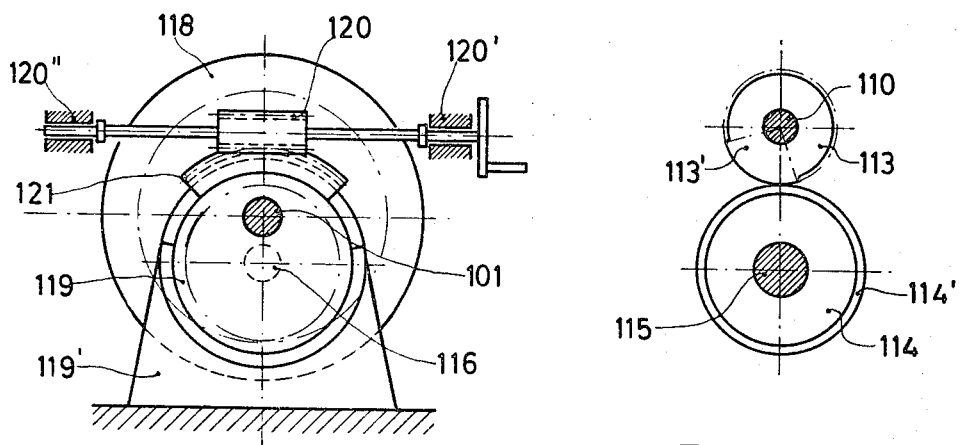
Fig. 14
Fig. 13

United States Patent Office 3,418,858
Patented Dec. 31, 1968

3,418,858
VARIABLE TRANSMISSION
Willy Minnich, Wandsbeker Chaussee 104a,
Hamburg 22, Germany
Filed Sept. 1, 1966, Ser. No. 576,617
20 Claims. (Cl. 74—68)

ABSTRACT OF THE DISCLOSURE

A transmission has an input section driving an output section. The input section has a transmission ratio cyclically varying in accordance with a geometrical progression having a constant factor, and the output section has a transmission ratio cyclically varying in accordance with a geometrical progression having a factor which is the reciprocal of the constant factor. Therefore, the output shaft of the transmission rotates at the same speed at which the input shaft is driven, until the relative position between the output element of the input section and the input element of the output section is adjusted for varying the transmission ratio between the input shaft and the output shaft.

---

The present invention relates to a variable transmission, and more particularly to a variable transmission including an input transmission section transforming a constant motion into a cyclically varying motion and an output transmission section transforming the cyclically varying motion periodically into a substantially constant motion whose speed is variable by suitable adjusting means. Several transmission units having successive periods of motion at constant speed, are advantageously combined for operating an output shaft continuously at a constant speed.

The adding together of parts of the motions of the output elements of the transmission units for rotating the output shaft of the entire transmission unavoidably causes disturbing forces produced by the movement of the masses, since the relative speed between the connected transmission means is different from zero.

It is an object of the invention to overcome this disadvantage of known transmissions of this type, and to provide a smoothly operating variable transmission.

Another object of the invention is to construct elements of the transmission in accordance with a mathematical law to obtain a reliably operating variable transmission.

With these objects in view, the transmission elements of an input transmission section have such a shape that the transmission ratio between the transmission elements varies during a sufficiently great part of the motion, continuously in accordance with the geometric progression with the constant factor $q$, while the transmission elements of the outlet section of the transmission are shaped so that the transmission ratio between the same varies in accordance with the same geometric progression according to the reciprocal $1/q$.

In an embodiment of the invention, connecting means connect the output element of the input transmission section with the input element of the output transmission section, and adjusting means are provided for adjusting the position of the output element of the input transmission section and of the input element of the output transmission section for varying the transmission ratio between the input means and output means of the entire transmission.

The geometric progressions are based on a constant differential element of the motion of the connecting means which may be related to a constant distance or angle. Power is only transmitted during predetermined parts of the motions. By adjusting the transmission elements of the input and output transmission sections relative to each other, the parts of the motions of the transmission elements of the input transmission section are displaced in relation to the parts of the motions of the transmission elements of the output transmission section whereby the transmission ratio between the input and output means of the entire transmission is varied in the motion period in which power is transmitted.

The transmission according to the invention has simple structural parts capable of transmitting the motion of an input means during predetermined periods into mathematically exactly uniform output motions, whose speed can be gradually varied. The used parts of the motions are put together without disturbing mass forces for rotating the output shaft.

The structural simplicity is obtained because the transformation of the transmission motions is based on the multiplication of transmission ratios, so that the transmission substantially consists of two interconnected transmission sections.

Only three transmissions according to the invention are required for obtaining a completely uniform, but variable rotary speed of a driven means, which constitutes a considerable advance of the art.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 4:
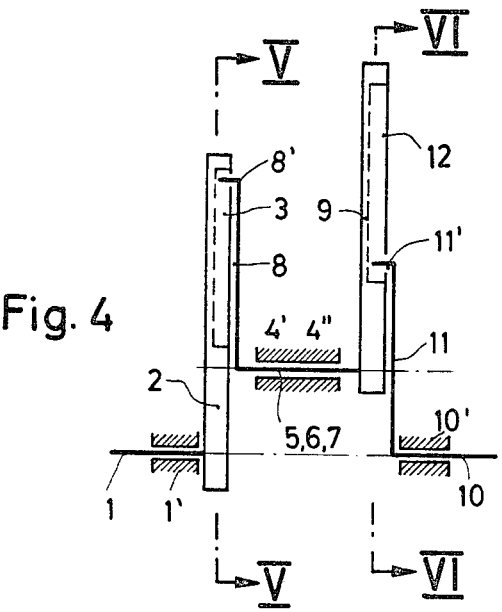
FIG. 4 is a schematic side view, partly in section, illustrating an embodiment of the invention.
Figure 11:
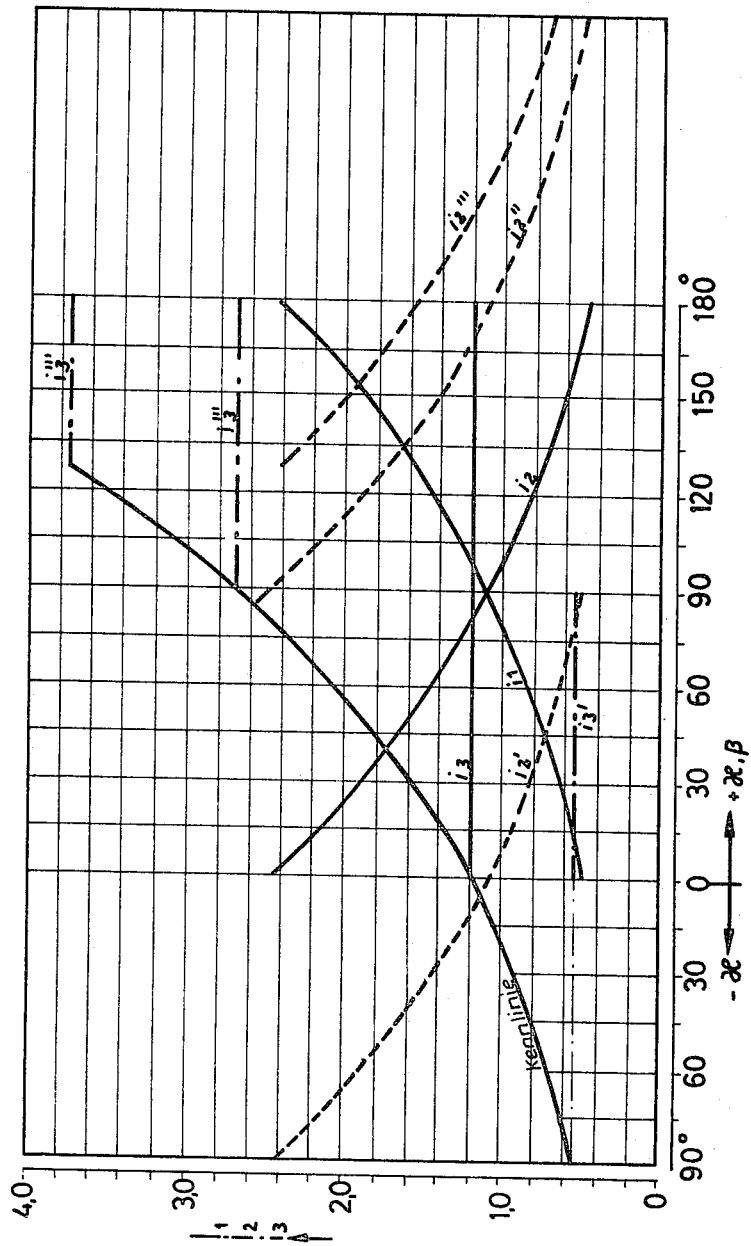
Figure 15:
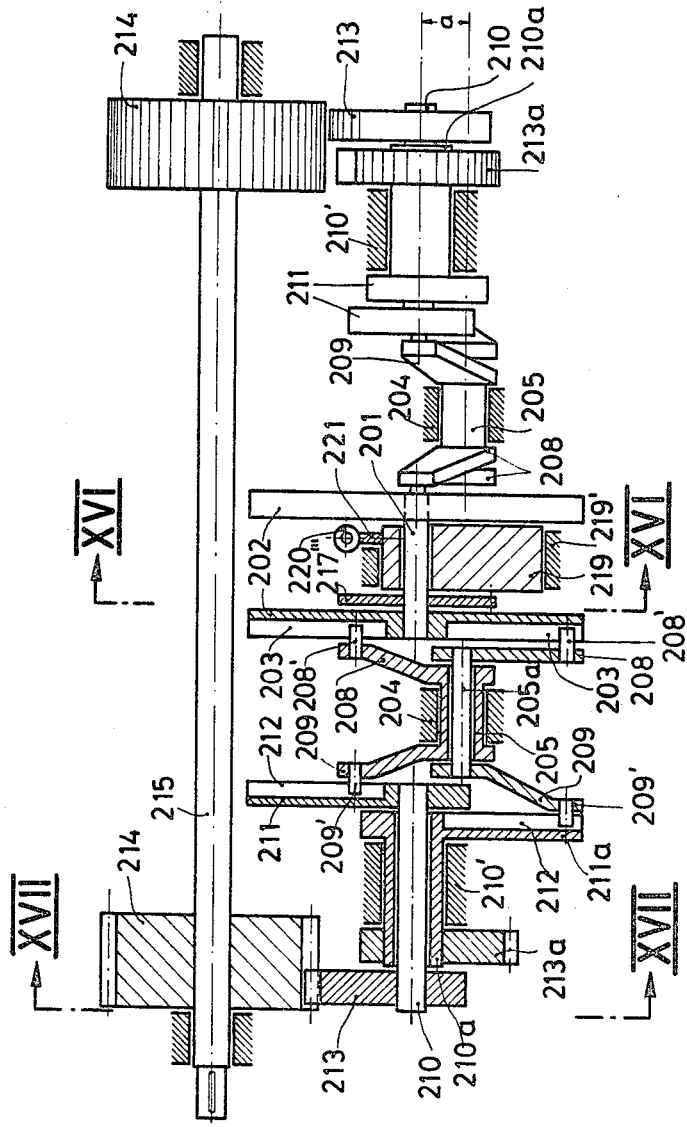
Figure 16:
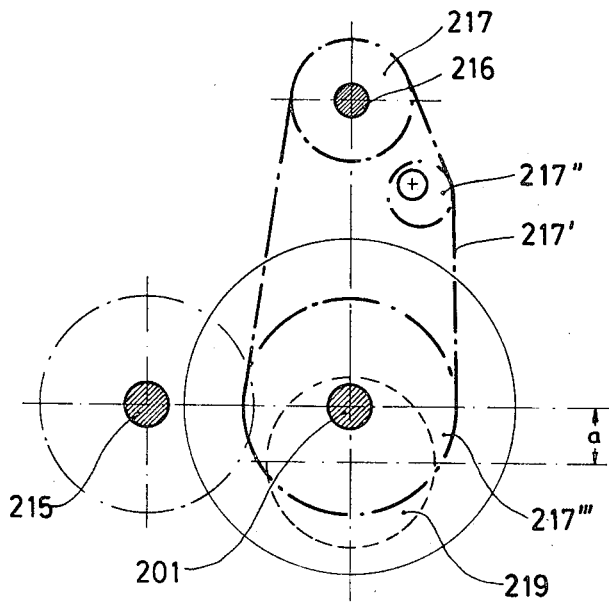
Figure 17:
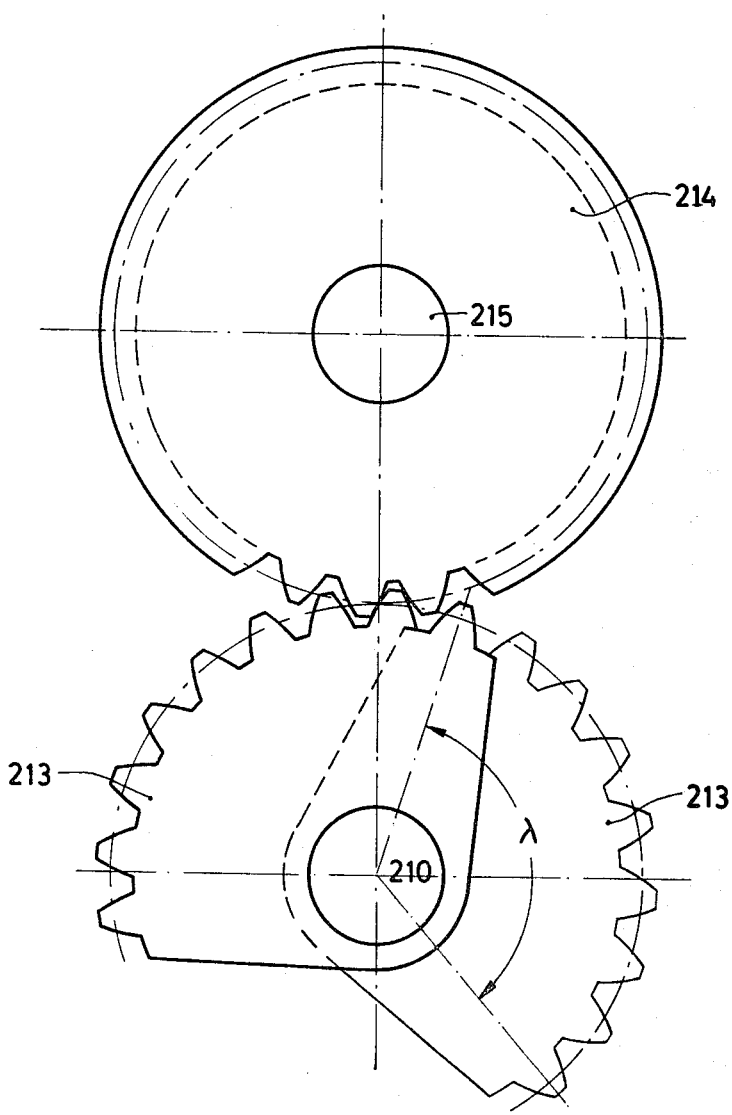
Figure 18:
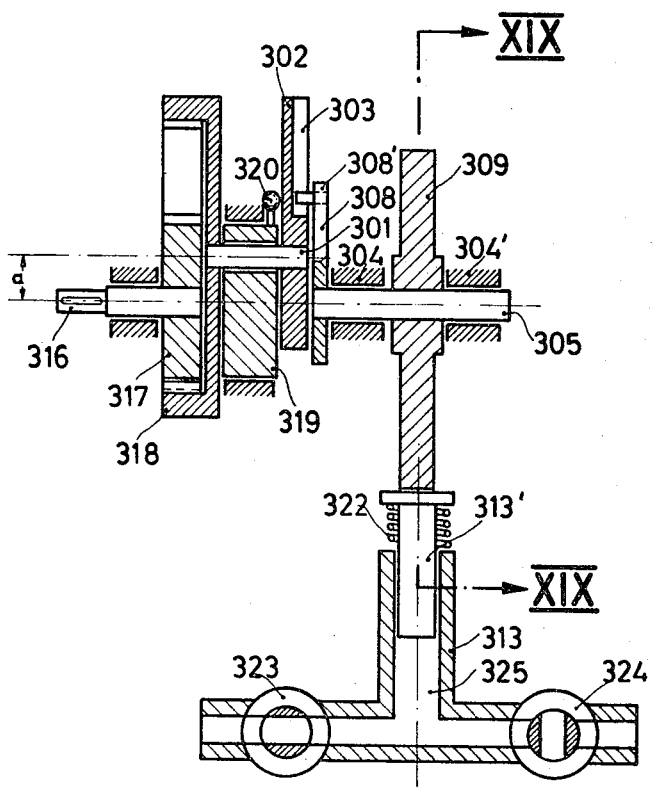
Figure 19:
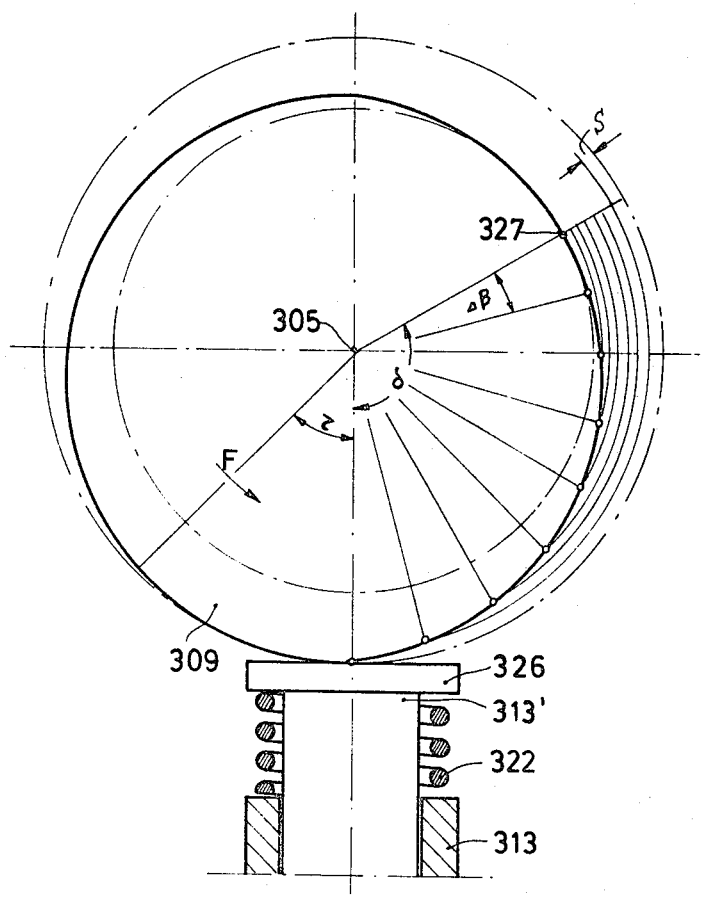
Figure 21:
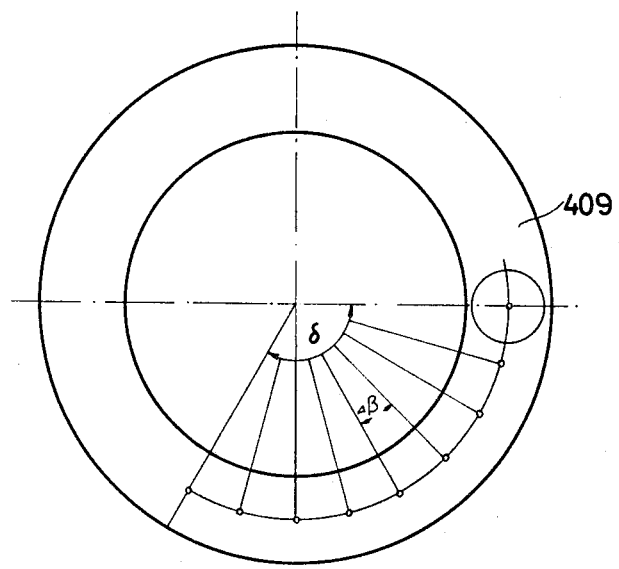
Figure 20:
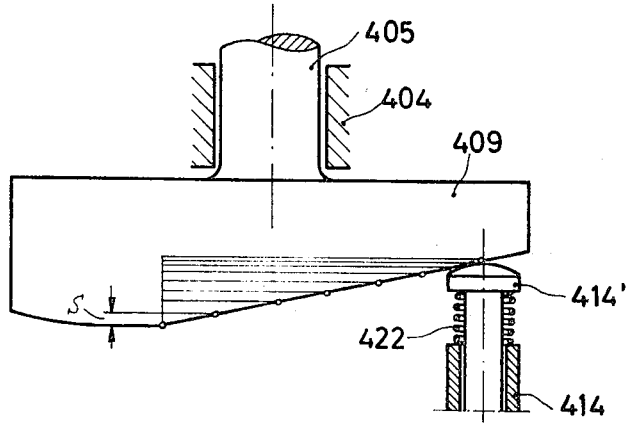

FGS. 5 and 6 are schematic diagrammatic views taken on lines V and VI, respectively and illustrating kinematic positions of transmission elements for a constant ratio of transmission;

FIGS. 7 to 10 are diagrammatic views illustrating kinematic positions of the transmission element of FIG. 4 for adjusted transmission ratios, FIGS. 7 and 9 being taken on line V—V, and FIGS. 8 and 10 being taken on lines VI—VI;

FIG. 11 is a diagram illustrating the dependence of constant variable output speeds on adjusted transmission ratios;

FIG. 12 is a schematic axial sectional view illustrating another embodiment of the invention;

FIG. 13 and FIG. 14 are fragmentary sectional views taken on lines XIII—XIII and XIV—XIV, respectively, in FIG. 12;

FIG. 15 is a schematic axial sectional view illustrating a further embodiment of the invention;

FIGS. 16 and 17 are fragmentary sectional views taken on lines XVI—XVI and XVII—XVII, respectively in FIG. 15, FIG. 17 being on an enlarged scale;

FIG. 18 is a schematic axial sectional view illustrating a further embodiment of the invention;

FIG. 19 is a fragmentary sectional view taken on line XIX—XIX in FIG. 18, and being on an enlarged scale;

FIG. 20 is a fragmentary side elevation, partially in section, and illustrating a detail of another embodiment of the invention; and FIG. 21 is a fragmentary schematic front view of a detail of FIG. 20.

Figure 1:
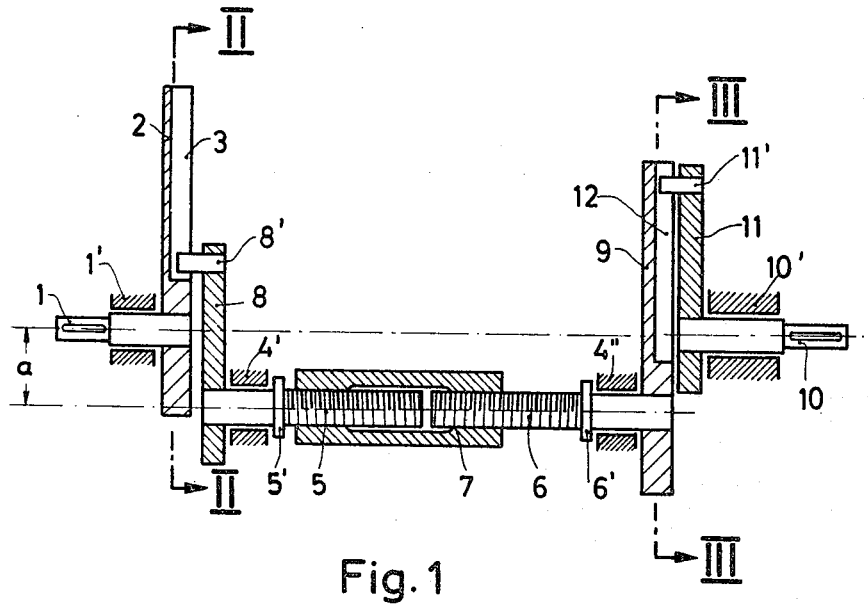
FIG. 1 is a schematic sectional view illustrating an embodiment of the invention.
Figure 2:
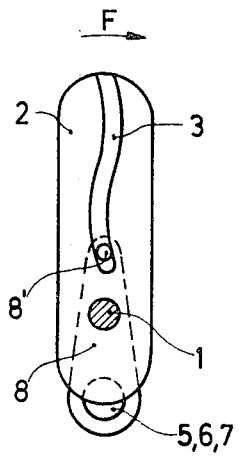
FIG. 2 and FIG. 3 are cross sectional views taken on lines II—II and III—I, respectively.
Figure 3:
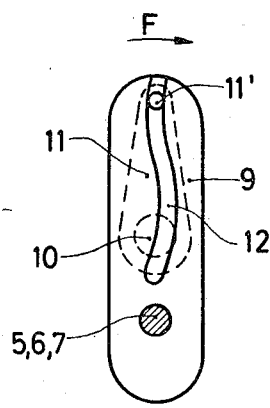

Referring now to the drawings, and more particularly to FIGS. 1 to 3, the transmission comprises an input transmission section including transmission elements 1, 2, 8 and an output transmission section including transmission elements 10, 11, 12. Connecting means 5, 6, 7 connect the input and output transmission sections.

The input shaft element 1 is mounted in a bearing 1' for rotation about an axis which is also the axis of an output shaft element 10 mounted in a bearing 10'. A connecting shaft includes two shaft portions 5 and 6 respectively mounted in bearings 4' and 4" and prevented from axial movement by flanges 5' and 6'. A threaded sleeve 7 is mounted on threaded portion of shaft 5 and 6 which have opposing threads so that the relative angular position of the shafts 5 and 6 can be varied by axially displacing sleeve 7.

The axis of shafts 5, 6 is parallel to the axis of shafts 1 and 10, and spaced the distance $a$ therefrom.

Shaft 1 carries an elongated transmission element 2 whose front face has a substantially radially extending S-shaped cam slot 3 engaged by a follower pin 8' on a crank 8 secured to shaft 5. Shaft 10 carries a crank 11 having a follower pin 11' engaging a substantially radially extending S-shaped cam slot 12 in a transmission element 9 which is secured to shaft 6. Motion transmitting means 2, 3, 8', 8 and 11, 11', 12, 9 cause cyclically varying transmission ratios between shafts 1 and 5, and shafts 6 and 10, respectively.

The opposing threads of shafts 5 and 6, and the threaded sleeve 7 have a thread of such a pitch that upon manual axial shifting of sleeve 7, shafts 5 and 6 are turned relative to each other an angle $\pm \mathcal{H}$ and since the connection is frictionally self-locking, the crank 8 and transmission element 9 remain in the angular adjusted position. During rotation of input shaft 5, its thread cannot turn sleeve 7 frictionally since this would require axial displacement of shaft 6. When sleeve 7 is axially shifted, the threaded shafts 5 and 6 turn in opposite directions. During operation, the opposing input torque and load torque tend to compress sleeve 7 which is not possible. The pressure on the threads couples the same frictionally with sleeve 7. The frictional coupling torque is greater than the load torque acting on shaft 6 and greater than the input torque of shaft 5. The plus and minus signs indicate whether the slotted transmission element 9, as viewed from the input end of the transmission, is turned to the right or left, respectively, in relation to crank 8, as is apparent from FIGS. 7 to 10.

In order to obtain a constant rotary speed of shaft 10 when shaft 1 is driven at a constant speed, it is necessary that the shapes of the slots 3 and 12 in FIGS. 1 and 4 are determined in accordance with a mathematical law, as will now be explained with reference to FIGS. 4 to 6. The slotted element 2 rotates at constant speed and turns crank 8 and the slotted element 9 at a varying speed, and the shape of the slots is to be designed so that crank 11 turns at least periodically at a constant speed. Crank 8 is connected with slotted element 9 in a parallel position so that the relative angle $\mathcal{H}=0$. In the illustrated initial position of crank 8, follower pin 8' is located at the point A, see FIG. 5, and turns in the clockwise direction indicated by the arrow F to the point B. It is assumed that crank 8 moves successively small and constant angular distances $\Delta\beta$. Since shaft 5, 6 and slotted element 9 are assumed to be rigidly connected with crank 8, they turn the same angular steps $\Delta\beta$.

The slotted element 2 and input shaft element 1 must turn angular distances $\Delta\alpha$ when crank 8, shafts 5, 6, and slotted element 9 turn angular distances $\Delta\beta$. FIG. 5 shows the initial position, an intermediate position, and the end position of slotted element 3 and crank 8. Follower pin 8' moves about a smaller circle having its center in the axis of shaft 5, 6, while the end of slot 3 moves along a larger circle having its center in the axis of shafts 1 and 10 which is the cause of the different angular steps performed by transmission elements 2 and 8.

Figure 6:
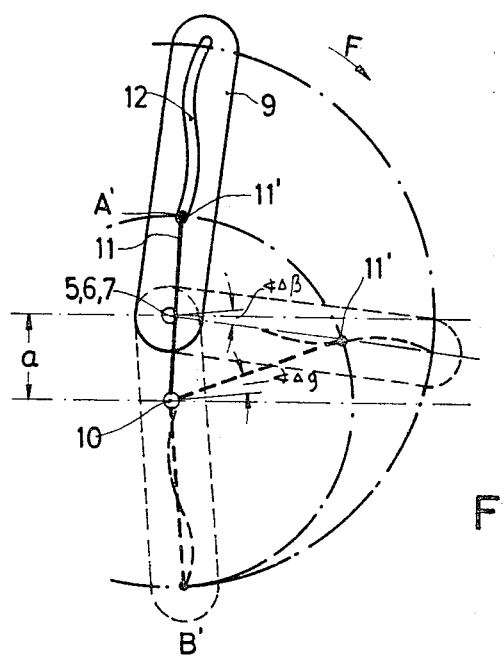

At the same time, the turning of the slotted element 9 in steps $\Delta\beta$, causes turning of crank 11 through angular distances $\Delta\rho$ until follower pin 11' arrives in the position B' as shown in FIG. 6 which also illustrates an intermediate position of slotted element 9 and crank 11. In the initial position, follower pin 11' is at the point A' and moves along a smaller circle having its center in the axis of shaft 10 to the point B', while the outer end of slot 12 of the slotted element 9 moves about a larger circle having its center in the axis of shaft 5, 6.

The magnitude of the angular distances $\Delta\alpha$ and $\Delta\rho$ is determined by the momentary transmission ratio associated with each angular distance $\Delta\beta$.

The momentary transmission ratio between transmission elements 2 and 8 can be mathematically expressed as follows:

$$i_{1\,\text{mom}} = \frac{\Delta\alpha}{\Delta\beta}$$

The momentary transmission ratio between transmission elements 9 and 11 can be mathematically expressed as follows:

$$i_{2\,\text{mom}} = \frac{\Delta\beta}{\Delta\rho}$$

$\Delta\beta$ being the same.

In accordance with the present invention, the cam slot 3 of transmission element 2 of the input transmission section, and the cam slot 12 of transmission element 9 of the output transmission section, are designed and constructed that the momentary transmission ratios $i_{1\,\text{mom}}$ and $i_{2\,\text{mom}}$ are elements of the same two geometric progressions, of which one ascents and the other descents so that the first geometric progression has a constant factor $1/q$ which is the reciprocal of the factor $q$ of the other geometric progression.

When the elements of the geometric progressions are indicated by corresponding indices from 1 to $n$, the momentary transmission ratios between input element 1 and connecting means 5, 6, 7 are expressed by the following geometric progression:

$$i_{1\,\text{mom}_1} = \frac{\Delta\alpha}{\Delta\beta};\ i_{1\,\text{mom}_2} = \frac{\Delta\alpha}{\Delta\beta} q;$$

$$i_{1\,\text{mom}_3} = \frac{\Delta\alpha}{\Delta\beta} q^2;\ \ldots\ i_{1\,\text{mom}_n} = \frac{\Delta\alpha}{\Delta\beta} q^{n-1}$$

while the momentary transmission ratios between the connecting means 5, 6, 7 and the output element 10 are expressed by the geometric progression:

$$i_{2\,\text{mom}_1} = \frac{\Delta\beta}{\Delta\rho};\ i_{2\,\text{mom}_2} = \frac{\Delta\beta}{\Delta\rho} \frac{1}{q};$$

$$i_{2\,\text{mom}_3} = \frac{\Delta\beta}{\Delta\rho} \frac{1}{q^2};\ \ldots\ i_{2\,\text{mom}_n} = \frac{\Delta\beta}{\Delta\rho} \frac{1}{q^{n-1}}$$

wherein $\Delta\beta$ is assumed to be constant.

The momentary transmission ratios of the two transmission sections as represented by the geometric progressions, vary dependent on the angular distances through which shaft 5, 6, 7 turns in the direction of the arrow F from point A to point B.

During operation of the transmission, input shaft element 1 rotates at uniform rotary speed, and connecting shaft 5, 6, 7 turns through successive angular distances $\Delta\beta$ at an angular speed varying in accordance with a geometric progression. The angular speed of connecting shaft 5, 6, 7 drops accordingly from a maximum value at the points A and A', to a minimum value at the points B and B', to rise again to the initial maximum value when further turning to the points A and A'.

If the elements of any part of the first geometric progression expressing the transmission ratio $i_{1\,\text{mom}}$ are multiplied in continuous succession by the elements of any selected part of the second geometric progression expressing the momentary transmission ratios $i_{2\,\text{mom}}$, the successive products are constant values $i_3$, which expresses a constant transmission ratio of the entire transmission between the input shaft element 1 and the output shaft element 10.

By associating different parts of the two geometric progressions with each other when carrying out the multiplications, the main transmission ratio $i_3$, is varied.

If a sufficiently small differential angle $\Delta\beta$ is selected, the variations of the corresponding elements of the geometric progressions are continuous, and the main transmission ratio $i_3$ is gradually varied and the transmission is stepless.

The elements of the two geometric progressions representing momentary transmission ratios, are represented by successive points along the length of cam slots 3 and 12. Referring now to FIGS. 7 to 10, the portions of the cam slots 3 and 12 along which the follower pins 8' and 11' simultaneously move, determine the main transmission ratio, and the transfer of torque and power from the input shaft element 1 to the output shaft element 10. The position and length of the associated power and motion transmitting portions of the cam grooves 3 and 12, depends on the adjustable angle $\pm \mathcal{H}$. When the angle between the output element 8 of the input transmission section, and the input element 9, 12 of the output transmission section is zero, power and motion is transmitted by the cam slots 3 and 12 along the entire length thereof, as explained with reference to FIGS. 4, 5 and 6.

Figure 5:
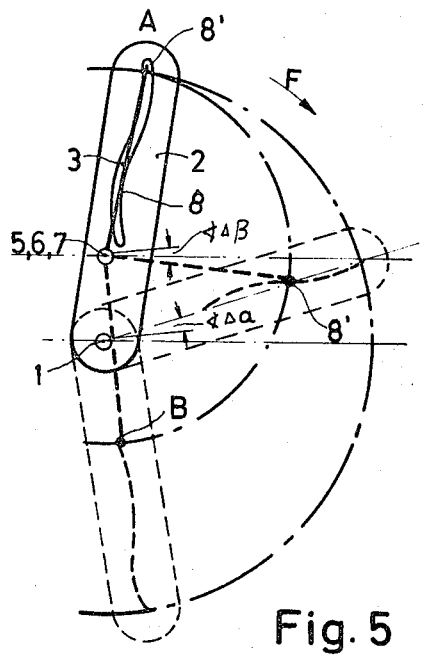

FIGS. 7 and 8 correspond to FIGS. 5 and 6, but assume that the angular position of transmission elements 8 and 9 has been adjusted to an angle $-\mathcal{H}$, while FIGS. 9 and 10 show the transmission in an adjusted position in which the angle between elements 8 and 9 has been adjusted to $+\mathcal{H}$.

Upon such relative angular adjustment between output element 8 of the input transmission section and input element 9 of the output transmission section, the power and motion transmission motion takes place when the respective follower pins move from points $E_1$ to points $E_2$, and the corresponding portions of the cam slots are hatched in FIGS. 7 to 10. Arrow F indicates the direction of rotation of input shaft element 1, and arrow S indicates the direction of motion of the follower pins 8' and 11' in the curved slots 3 and 12. The portions of the cam slots engaged by the follower pins are curved. The positions of the initial points $E_1$ and final points $E_2$ of the respective portions of the cam slots, indicates the selected and adjusted main transmission ratio $i_3$ between the input shaft element 1 and the output shaft element 10. When the relative angle $\pm \mathcal{H}$ is gradually adjusted, points $E_1$ and $E_2$ are gradually and continuously displaced relative to each other while the respective power and motion transmitting portions of the cam slots are correspondingly lengthened or shortened.

In the range of adjustment $\pm \mathcal{H}$, an infinite number of main transmission ratios $i_3$ is possible, each of which is constant for the respective portions of the cam slots. A sufficiently great part of the periodically varying motions of the transmission elements follows a predetermined mathematical law for obtaining a variable transmission whose input and output elements rotate cyclically at uniform speeds.

As is well known, every motion in a plane can be represented by two contact curves or pole paths rolling on each other and touching each other in a momentary pole. If the pole paths are selected in accordance with the invention, the succession of momentary poles in the input transmission section results in momentary transmission ratios which vary in accordance with the above discussed geometric progression, while the pole paths of the output transmission section result in momentary transmission ratios which also vary in accordance with the geometric progression but in accordance with the reciprocal value of the constant factor.

At a selected adjustment of the main transmission ratio $i_3$, particular portions of the pole paths of the input transmission section correspond with particular portions of the pole paths of the output transmission section. Upon adjustment of the transmission elements of the input and output transmission sections relative to each other, the transformation of motion takes place with different portions of the pole paths of the input transmission section associated with portions of the pole paths of the outer transmission sections, and only if the pole paths are shaped and constructed in accordance with the present invention, a constant, although variable, main transmission ratio $i_3$ between the input and output elements of the entire transmission results due to the multiplication of the transmission ratios of the momentary poles of the input transmission section with the transmission ratios of the momentary poles of the output transmission section.

In the diagram of FIG. 11, the ordinates represent transmission ratios, and the abscissae represent positive and negative values of the angles $\mathcal{H}$ and $\beta$. The momentary transmission ratios $i_{1\,mom}$, $i_{2\,mom}$, are represented by $i_1$, $i_2$ for the sake of simplicity. Different values of the main transmission ratio are represented by $i_3'$, $i_3''$, $i_3'''$.

When the relative angular position between the output element 8 of the input transmission section and the input element 9 of the output transmission section, together with shafts 5 and 6, is varied the angle $\pm \mathcal{H}$, the graph representing the momentary transmission ratio $i_2$ is displaced in a direction of the abscissa from the position $i_2$ to the positions $i_2'$, $i_2''$, $i_2'''$ so that different sections of the respective graph overlap with the graph representing the momentary transmission ratio $i_1$. If the ordinate values of the respective overlapping portions of the graphs are multiplied, straight lines $i_3$; $i_3'$; $i_3''$; $i_3'''$ result, indicating that the main transmission ratio is constant for each adjusted angular position at least during a part of each revolution.

In practical embodiments of the invention, different shapes of cam slots 3, 12 may be used. Pairs of cam slots 3, 12 may be different, but if the connecting shaft carries cranks at both ends, the cam slots are identical in shape. It is not necessary that the input shaft element 1 and the output shaft element 10 are spaced the same distance $a$ from the axis of the connecting shaft 5, 6, or are located in the same plane as the same.

While the crank pins move along the respective associated cam slot portions, output shaft element 10 turns at an exactly constant and uniform speed through a particular angular section of each revolution. The angle and the position of this angular section, in relation to a fixed point, is not changed for each adjustment of the transmission, but when the transmission is adjusted to a different main ratio $i_3$ between input shaft element 1 and output shaft element 10 the angle and position of the respective angular section are varied. When a particular main transmission ratio has been selected, an output shaft element 10 turns at a uniform and constant speed through the respective angular section of each revolution. Output shaft element 10 is connected with a driven element, such as a main output shaft which may be driven by several transmissions according to the present invention so that each transmission turns the driven shaft when its output element 10 turns at constant rotary speed through an angular section of the entire revolution. The angular section of constant speed is varied when the main transmission ratio is adjusted, but remains during the entire range of adjustment within such limits that a constant minimum angular section remains, in which the output shaft element 10 moves at constant and uniform speed.

The constant rotary speed within the respective angular section of each revolution makes it possible to use a segment-shaped coupling means for transmitting motion from the output element of the transmission to a driven means only during the part of each revolution of the output element when the same moves at constant speed. Consequently, the segment-shaped coupling means extends along an arc corresponding to the angular section of constant speed of each revolution of output element 10 in FIGS. 1 and 4, and of output element 110 in FIG. 12 which will be explained hereinafter. The adjustment of the periodical constant speed of the output element can be obtained by adjusting the relative position of transmission elements of the input and output sections of the transmission.

In the embodiment of FIG. 1, the shafts 5 and 6 are turned relative to each other by operation of the sleeve 7. However, it is also possible to mount input shaft element 1 with slotted transmission element 2, or output shaft element 10 with crank 11 in a bearing which is mounted for movement about the axis of the connecting shaft 5, 6, and to vary the main transmission ratio $i_3$ by adjusting the position of the respective bearing. In a further modification which involves a kinematic reversal, connecting shaft means 5, 6, 7 is provided at its ends with cranks, and the transmission elements carried by input and output shaft elements 1 and 10 are provided with cam slots.

An embodiment of the invention modified in this manner is illustrated in FIGS. 12 to 14. The transmission has an input transmission section and an output transmission section connected by the connecting shaft 105 which is mounted in a stationary bearing 104. The input shaft element 110 of the input transmission section is mounted in a stationary bearing 116' for rotation about an axis coinciding with the axis of connecting shaft means 105. Input shaft element 116 carries a fixed gear 117 meshing with an inner gear of a transmission element 118 which is fixedly secured to a shaft 101 turnable about an axis coinciding with the axis of the output shaft element 110 of the output transmission section. Shaft 101 is rotatably mounted in a bearing means 119 which is supported in a bearing 119' for rotation about an axis coinciding with the axis of shaft 116 and 105. As best seen in FIG. 14, bearing means 119 carries a fixed gear segment 121 meshing with a worm 120 of a manually operated spindle which is mounted in bearings 120' and 120''. When the handle of the spindle is turned, the adjustable bearing means 119 turns in bearing 119' whereby shaft 101, and transmission elements 118 and 102 carried by the same, are displaced along a circular path.

Transmission element 102 has a substantially radially extending curved cam slot 103, corresponding to cam slot 3 of the embodiment of FIG. 1.

Slot 103 is engaged by the follower pin 108' of a crank 108 secured to the connecting shaft 105 which carries at the other end thereof a corresponding crank 109 whose follower pin 109' engages the cam slot 112 of a slotted transmission element 111 secured to the output shaft element 110 which is mounted for turning movement in stationary bearings 110' and 110''. Output shaft element 110 is parallel to, and spaced a distance $a$ from the input shaft element 116 and connecting shaft 105. A wheel 113 is carried by shaft 110 and has along a portion of the periphery thereof, a segment-shaped friction coupling portion 113', as best seen in FIG. 13.

A driven shaft or output shaft 115 is mounted in bearing 115', 115'' and provided with a friction lining 114' about the periphery thereof. Only when the segment-shaped coupling portion 113' engages the outer periphery of the coupling wheel 114, 114', shaft 115 is driven from output shaft element 110 of the transmission. The length of the arc of the segment-shaped coupling portion 113', and its angular position in relation to output shaft element 110, is selected so that coupling means 113', 114', 114 are only operative and engaged during angular sections of each revolution of output shaft element 110 during which the same rotates at constant speed.

While in the embodiment of FIG. 1, the input transmission section comprises the transmission element 1, 2, 8, and the output transmission section comprises transmission elements 9, 11, 10, in the embodiment of FIGS. 12 to 14, the input transmission section comprises transmission elements 116, 117, 118, 101, 102, and 108, and the output transmission section comprises transmission elements 109, 111, and 110. Coupling means 113, 113', 114', 114 cyclically and periodically connect output shaft element 110 with the driven output shaft 115 during the part of each revolution in which output shaft element 110 rotates at a constant rotary speed so that during these time periods, driven shaft 115 is also driven at a constant speed.

In order to obtain continuous rotation of output shaft 115, coupling wheel 114, 114' is driven by a plurality of segment-shaped coupling portions 113' provided on wheels 113 of a plurality of transmissions, only one of which is shown in FIG. 12. It is necessary that the several transmissions are phase displaced, so that the respective output shaft elements 110 turn at constant speed during time periods which succeed each other. In other words, the segment-shaped coupling portions 113' successively engage the coupling wheel 114, 114' during each revolution of output shaft 115. Preferably, the ends of the engaging faces of successive coupling portions 113' overlap and simultaneously engage the periphery of the coupling wheel 114, 114' to assure a continuous, constant, and uniform rotation of the driven output shaft 115.

The phase angle λ between successive segment-shaped coupling portions 113' while the same move at a constant rotary speed, depends on the adjusted main transmission ratio $i_3$ which in the embodiment of FIGS. 12 to 14 is varied and selected by angular adjustment of the turnable bearing means 119 since the position of shaft 101 and of transmission elements 118 and 102 is changed when bearing means 199 is turned, resulting in a different relative position between slot 103 and follower pin 108'. Each variation of the main transmission ratio $i_3$ changes the phase displacement angle λ, and the degree of overlapping of the segment-shaped coupling portions 113'. In the range of high transmission ratios $i_3$, corresponding to a small number of revolutions of the output shaft, the overlapping of the segment-shaped coupling portion 113' is greater than in the range of small transmission ratios.

The friction coupling means 113, 114 have the advantage that no relative movement takes place between the coupling surfaces of parts 113' and 114' so that friction wheels of substantial width operating at high coupling pressure can be economically used.

The invention may also be applied to a multistage transmission, and has the advantage that even during the adjustment of the transmission ratio, an exact positive mechanical connection without play is maintained between the input shaft and the output shaft. Several transmissions according to the invention are combined in a transmission arrangement of FIGS. 15 to 17.

The transmission according to this embodiment of the invention includes two transmissions connected by a common input shaft element 201. Each transmission includes two input sections and two output sections connected by shafts 205 and 205a.

Shaft 201 is eccentrically mounted in a bearing means 219 which is turnable about the axis of shaft 205. The angular position of bearing means 219 and thereby the position of shaft 201 can be adjusted by a turnable worm spindle 220 meshing with a gear segment secured to bearing means 219, as explained with reference to FIG. 14. Shaft 201 carries two slotted transmission elements 202, each of which has two diametrically arranged curved cam slots 203, the cam slots of the two transmission elements 202 extending at right angles to each other so that the four cam slots 203 are arranged symmetrically about the axis of shaft 201 spaced substantially 90° from each other, as indicated by the positions of the two cranks 208 whose follower pins 208' respectively engage the cam slots 203 of the two slotted transmission elements 202.

As best seen in FIG. 16, a drive shaft 216 carries a chain wheel 217 driving a chain 217' which is tensioned by an adjustable chain wheel 217" and is guided in a loop over a chain wheel 217'" secured to shaft 201. Only chain wheel 217'" appears in FIG. 15. The tensioning chain wheel 217" can be adjusted within such a range that shaft 201 can be adjusted by turning of bearing means 219 while the chain transmission between shaft 216 and 201 remains operative irrespective of the displacement of shaft 201.

Shafts 205 carry at opposite ends cranks 208 and 209 having follower pins 208' and 209'. Shafts 205 are hollow, and other shafts 205a are located within the hollow shaft 205 and carry at opposite ends, corresponding cranks 208, 209 with follower pins 208' and 209'. The follower pins 208, 208' of each transmission stage respectively engage slots 203 of the two slotted transmission elements 202. The follower pins 209, 209' of the two transmission stages respectively engage curved cam slots 212 of transmission elements 211, 211a. Transmission elements 211 are secured to shaft 210 of the two transmission stages, and transmission elements 211a are secured to hollow shafts 210a which are mounted in bearings 210'. The other ends of hollow shafts 210a carry gear segments 213a, while the other ends of shafts 210 carry gear segments 213. The two gear segments 213, 213a at both outer ends of the transmission successively mesh with gears 214 which are secured to a shaft 215, as also shown in FIG. 17. The successive coupling between gear segments 213, 213a and gears 214, preferably in overlapping succession, is obtained by adjustment of the adjustable shaft 201 which is displaced about a circular path when the turnable bearing means 219 is angularly adjusted by operation of worm spindle 220. The angle of phase displacement λ between gear segments 213, 213a is varied by adjustment of bearing means 219. The variation of the phase displacement angle by such adjustment, must correspond to the pitch of the gear segments 213, 213a and of gears 214 in order to obtain a proper meshing engagement between the coupling teeth. Bearing means 219 is consequently adjusted in steps, each angular step of bearing means 219 being associated with a different phase displacement angle, each of which is divisible by the pitch to assure the proper meshing engagement. During the adjustment of the position of shaft 201, the main transmission ratio between input shaft means 216 and input shaft element 201 on one hand, and output shaft means 215 and output shaft elements 210, 210a on the other hand is varied continuously without any jerks or other disturbances.

In the above described embodiments of the invention, the input and output elements are rotary shafts. However, the transmission according to the invention can also be used for producing linear movements of output elements at a constant speed. The speeds rise or fall in accordance with geometric progressions. The shape of the cam slots or other cam means can be mathematically determined. The embodiment of FIGS. 18 and 19 transforms a rotary motion into a linear motion at a constant speed, and at a selectable transmission ratio. The input transmission section of the transmission corresponds to the input transmission section of FIG. 12. An input shaft element 216 carries a gear 217 meshing with an inner gear of transmission element 218 which is carried by a shaft 301 whose position is adjustable by turning bearing means 219 by the manually operated worm spindle 320. Shaft 301 is spaced the distance a from the axis of input shaft element 316 which coincides with the axis of the output shaft element 305 of the input transmission section. Shaft 105 is mounted in bearing 304, 304' and carries a crank 308 whose follower pin 308' engages a curved cam slot 303 in a transmission element 302 carried by shaft 301. Shaft 305 carries a cam 309 whose shape is best seen in FIG. 19. A cylinder 313 has an axis perpendicular to the axis of shaft 305 and opening into a conduit provided with inlet and outlet valves 323, 324. A piston 313' is located in the piston chamber 325 and biased by spring 322 to abut the cam track of cam 309. To reduce friction, a roller or slide shoes may be provided between piston 313' and cam 309. When shaft 305 rotates cam 309, piston 313 is reciprocated, and the valves 323, 324 are controlled so that a fluid is pumped during reciprocation of piston 313. Cam slot 303 and the peripheral cam track of cam 309 are constructed and shaped in accordance with geometrical progressions having reciprocal factors, as explained above.

The peripheral contour of cam 309 along the angular sector δ has between the points 327, 328, such a shape that assuming a stepwise turning of cam 309 through constant angular distances Δβ, the length of the radial distance s, which is identical with the distance which piston 313' moves in the cylinder, varies in accordance with the same geometric progression, but having a reciprocal factor, which determines the shape of the cam slot 303 of transmission element 302 depending on the same constant angle of displacement Δβ.

Assuming a predetermined adjustment of the position of bearing means 219, upon rotation of the input shaft element 316, at the moment of engagement between each point of the cam periphery along the angle δ with the piston 313', the momentary transmission ratio $i_{1\,mom}$ between input shaft element 316 and shaft 305 is multiplied with the momentary transmission ratio $i_{2\,mom}$ between shaft 305 and piston 313, resulting in a motion of piston 313' at an exactly uniform and constant speed during a working stroke. When the position of bearing means 319 is adjusted by the adjusting means 320, the speed of piston 313' is varied.

The piston chamber 325 of cylinder 313 is separated at the beginning of the working stroke of piston 313' from the inlet valve 324 and connected by valve 323 with the outlet, so that power is transmitted only during the motion of piston 313' at constant speeds, and during this period, the fluid is discharged against the pressure at the outlet. When piston 313' arrives at the end of its working stroke at constant speed, valve 323 closes and valve 324 opens to establish connection with the fluid inlet.

A pump is preferably constructed of four transmission and pump units as shown in FIG. 18, which operate at a phase displacement so that the working strokes of the four pistons 313' take place successively preferably without overlapping, so that a continuous stream of fluid is produced by the four pump units.

The cylinders of the four phase displaced pump units are connected in series. Each unit has a valve which controls the inlet and outlet valves of the cylinder of the next following pump unit, and which is controlled, for example, by a cam secured to shaft 305 of the transmission of the first unit. The outlet of the cylinder is closed, and the inlet opened until the end 326 of the operative cam track section of cam 309 of the first unit arrives at the point of engagement with piston 313'. When the cam moves beyond this point, the inlet valve closes and the outlet valve opens in the next following pump unit. When the piston 313' arrives in its lowest position, it remains for a short while in this position due to a circular portion of the cam track of cam 309 provided along the angle τ. This time is used for opening the inlet and closing the outlet, whereupon the piston moves again upward under the action of spring 322.

Each unit may be provided with two cylinders 313 and pistons 313' which are disposed at an angle of 180° whereby the load on shaft 305 is uniformly distributed.

As compared with other pump arrangements, the pump and transmission arrangement according to the present invention produces a pulsation free continuous stream of discharged liquid. Due to the drive of the pumps by transmissions according to the invention, the fluid pressure and the flow volume per time unit are gradually adjustable for a constant rotary speed of the input shaft, and constant power at the input and output.

Instead of the arrangement of the cylinder and piston of the pump for movement along a line radial to the axis of shaft 305, it is also possible to arrange a driven element for linear reciprocation in axial direction of the output shaft element of the input transmission section.

In the embodiment illustrated in FIGS. 20 and 21, which only shows parts which are modified in comparison with the embodiment of FIG. 18, the axis of pump cylinder 414 and piston 414' is parallel to the axis of the output shaft element 405 which corresponds to output shaft element 305 of FIG. 14, and which is driven at a varying speed in accordance with a geometric progression. Cam 405 carries a cam 409 with a frontal cam face designed in accordance with a geometrical progression having a reciprocal factor. Spring 422 urges the piston head against the cam face which has a contour axially varied along a circular path concentric with the axis of shaft 405. In the region of the working stroke of piston 414', the axial contour of the cam face within the angle $\delta$ follows the geometrical progression according to the present invention, and the axial distance S which the piston is displaced during turning of the cam through an angle $\Delta\beta$ corresponds to the radial distance of displacement S described with reference to FIG. 19. In the embodiments of FIGS. 18 and 20, the inlet transmission section includes the transmission elements between input transmission element 316 and output transmission element 308, and is connected by shaft 305 to the output transmission section 309, 313', and 409, 414', respectively.

It will be understood that each of the elements described above, or two or more together, may also find a useful application in other types of variable transmissions differing from the types described above.

While the invention has been illustrated and described as embodied in a transmission having an input transmission section and an output transmission section whose momentary transmission ratios vary in accordance with geometrical progressions having reciprocal constant factors so that the input speed and output speed of the transmission are constant and uniform, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A variable transmission comprising an input transmission section having a plurality of first transmission elements including a first input element adapted to be driven at a constant speed, a first output element and first motion transmitting means connecting said first input element with said first ouput element and being arranged, shaped, and constructed so that the transmission ratio between said first input element and said first output element cyclically varies in accordance with a geometric progression having a constant factor whereby said first output element moves at a cyclically varying speed when said first input element moves at a constant speed; connecting means connected with said first output element for movement therewith; an output transmission section having a plurality of second transmission elements including a second input element connected with said connecting means and thereby with said first output element for movement therewith, a second output element, and second motion transmitting means connecting said second input element with said second output element and being arranged, shaped, and constructed so that the transmission ratio between said second input element and said second output element cyclically varies in said geometric progression having a factor which is the reciprocal of said constant factor so that said second output element moves at least during intermittent time periods at a constant speed; and adjusting means for adjusting the relative position of said first and second transmission elements for varying the main transmission ratio between said first input element and said second output element.

2. A transmission as claimed in claim 1 wherein said first and second motion transmitting means each includes a cam track and a follower means engaging said cam track, each of said cam tracks being curved in accordance with a geometrical progression.

3. A transmission as claimed in claim 1 wherein said first motion transmitting means includes two first rotary transmission elements one of which includes a cam track and the other of which includes a follower means engaging the same; and wherein said second motion transmitting means includes two second rotary transmission elements one of which includes a cam track and the other of which includes a follower means engaging the same.

4. A transmission as claimed in claim 1 wherein at least one of said first and second motion transmitting means includes a rotary transmission element having a curved cam slot, and a rotary transmission element having a cam follower engaging the respective cam slot.

5. A transmission according to claim 1 and comprising driven means; and coupling means for connecting said second output element only during said time periods of constant speed with said driven means.

6. A transmission according to claim 1 wherein at least some of said transmission elements rotate in phase-displaced positions.

7. A transmission according to claim 1 wherein said connecting means include a turnable member whose angular displacement within a selected time unit is an element of said geometric progressions.

8. A transmission according to claim 1 wherein said transmission elements include a shaft having an axis; and wherein said adjusting means include a bearing means for said shaft mounted for turning movement about an axis parallel to said axis of said shaft so that the position of said shaft is adjusted by turning of said bearing means for adjusting the main tranmission ratio.

9. A transmission according to claim 1 wherein said adjusting means is operatively connected with said first output element and said second input element for adjusting the relative position of the same for varying said main transmission ratio.

10. A plurality of transmissions as set forth in claim 1 having a plurality of said second output elements; wherein said second output elements are rotary elements; and comprising driven shaft means; and a plurality of coupling means for coupling said rotary second output element with said driven shaft means only during said time periods of constant speed, said time periods being phase displaced.

11. A transmission according to claim 10 wherein each of said coupling means includes a segment-shaped coupling portion secured to each of said rotary outlet elements, and a coupling wheel driven in succession by said segment-shaped coupling portion and being secured to said driven shaft means.

12. A transmission according to claim 1 wherein said first input element and said first output element are rotary elements; and wherein said second output elements is mounted for reciprocation along a straight path; and wherein said second transmission elements include means for transforming a rotary motion into a rectilinear motion at a transmission ratio varying in said geometric progression with said reciprocal factor.

13. A transmission according to claim 1 wherein said first input element and said second output element are axially aligned shafts having a common axis; wherein said first output element and said second input element are axially aligned shafts having a common axis parallel to said first mentioned common axis; and wherein said connecting means include connecting shaft means connecting said first output shaft and said second input shaft for rotation and being coaxial with the same.

14. A transmission according to claim 1 wherein said transmission elements include means for mounting said first input shaft and said second output shaft for angular turning movement along a circular path about the axis of said connecting shaft means.

15. A transmission according to claim 13 wherein said connecting shaft means include first and second connecting shafts respectively secured to said first output shaft and said second input shaft for rotation; and wherein said adjusting means include means for turning said connecting shafts and thereby said first output shaft and said second input shaft relative to each other through selected angles for varying the main transmission ratio.

16. A transmission according to claim 1 wherein said second transmission section includes a rotary cam driven from said first output element; and wherein said second output element is mounted for reciprocation and has follower means cooperating with said cam so that said second output element reciprocates; and wherein an angular section of said cam produces a working stroke of said second output element, the cam track of said angular section having such a shape that during turning movement of said cam for constant angles, the momentary transmission ratio between said cam and said reciprocating second output element varies in accordance with said geometric progression having said reciprocal factor; and wherein said first transmission element includes a rotary crank having a follower pin, and a slotted member having a cam groove engaged by said follower pin and being curved in accordance with said geometric progression having said constant factor and being based on said constant angle.

17. A transmission according to claim 16 wherein said first output element is a first output shaft supporting said cam for rotation; and including means for mounting said second output element for reciprocation along a path perpendicular to the axis of said first output shaft; and wherein said cam has a peripheral cam face cooperating with said second output element for reciprocating the same.

18. A transmission according to claim 16 wherein said first output element is a first output shaft; wherein said cam is secured to said first output shaft and has a frontal cam face cooperating with said second output element; and wherein said second output element is mounted for reciprocation along a path parallel to the axis of said first output shaft.

19. A transmission according to claim 1 wherein said second output element is a second output shaft; comprising rotary driven means; and coupling means for connecting said second output shaft only during said time periods of constant speeds with said driven means; said coupling means including a segment-shaped coupling portion having a friction face and being secured to said second output shaft for rotation therewith, and a coupling wheel having a periphery engaged by said friction face of said coupling portion and being secured to said rotary driven means, the angle of said friction coupling portion being selected so that said rotary driven means is turned only during said time periods of constant speed.

20. A transmission according to claim 1 wherein said second output element is a second output shaft; and comprising driven means; and coupling means for connecting said second output shaft with said driven means for rotation only during said time periods of constant speed; said coupling means including a segment-shaped gear secured to said second output element for rotation therewith, and a coupling gear secured to said rotary driven means for rotation therewith and meshing with said segment-shaped gear, the angle of said segment-shaped gear being selected so that said driven means is rotated only during said time periods of constant speed.

References Cited

UNITED STATES PATENTS

| | | | |
|---|---|---|---|
| 2,119,955 | 6/1938 | Litton | 74—68 |
| 2,605,647 | 8/1952 | Duvoisin | 74—436 |

FOREIGN PATENTS 352,729   4/1961   Switzerland.

FRED C. MATTERN, JR., *Primary Examiner.*

W. S. RATLIFF, JR., *Assistant Examiner.*

U.S. Cl. X.R.

74—436